United States Patent [19]

Chainer et al.

[11] Patent Number: 4,553,258

[45] Date of Patent: Nov. 12, 1985

[54] SEGMENTATION ALGORITHM FOR SIGNATURE VERTIFICATION

[75] Inventors: Timothy J. Chainer, Mahopac; Thomas K. Worthington, South Salem, both of N.Y.

[73] Assignee: International Business Machines Corporation, Armonk, N.Y.

[21] Appl. No.: 567,200

[22] Filed: Dec. 30, 1983

[51] Int. Cl.⁴ .............................................. G06K 9/34
[52] U.S. Cl. ............................................. 382/3; 382/13
[58] Field of Search .............................. 382/3, 59, 13

[56] References Cited

U.S. PATENT DOCUMENTS

| | | | |
|---|---|---|---|
| 3,983,535 | 9/1976 | Herbst et al. | 382/3 |
| 4,086,567 | 4/1978 | Crane et al. | 382/3 |
| 4,128,829 | 12/1978 | Herbst et al. | 382/3 |

Primary Examiner—Leo H. Boudreau
Assistant Examiner—Michael M. Murray
Attorney, Agent, or Firm—Roy R. Schlemmer

[57] ABSTRACT

A signature verification method is based on a comparison of the dynamics of a reference and a sample signature. Acceleration and pressure signals produced by a known person when writing his or her signature are stored and used as a reference signals. Then, at a later time, a person whose signature is to be verified writes his or her signature to produce acceleration and pressure signals that are compared to the reference signals. The process of comparison involves segmenting the two sets of signals to facilitate identifying regions of high probable correlation and then correlating corresponding segment pairs. Segmentation is based on pen lifts which represent reproducible timing marks in the signatures. According to the disclosed method, a pen or other writing instrument is used which produces a signal representative of the first time derivative of the pressure forces exerted on the stylus of the pen. The second time derivative of the pressure forces is computed from the measured signal. The first and second time derivatives are examined to detect quiet times indicative of lifting the pen from a writing surface. The detected quiet times are checked to determine if they have a time duration which exceeds a predetermined time period. The polarity and amplitude of the second time derivatives are tested to determine if they are positive and exceed a predetermined threshold at the beginning and end of each detected quiet time. Preferably, the steps of detecting quiet times, examining the duration of the quiet times, and testing the polarity and amplitude of the second derivatives are performed concurrently.

8 Claims, 4 Drawing Figures

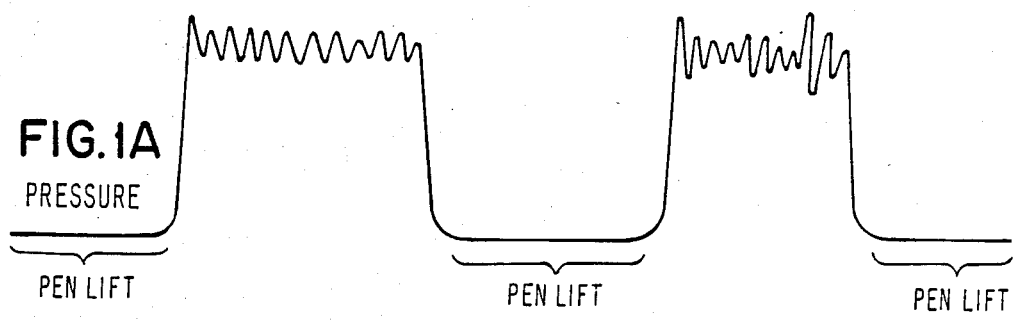
FIG.1A PRESSURE
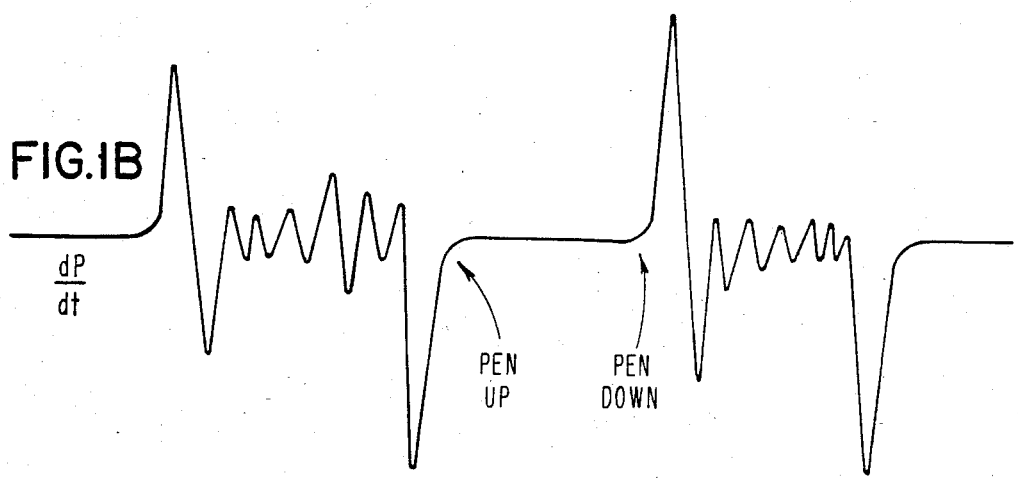
FIG.1B $\frac{dP}{dt}$
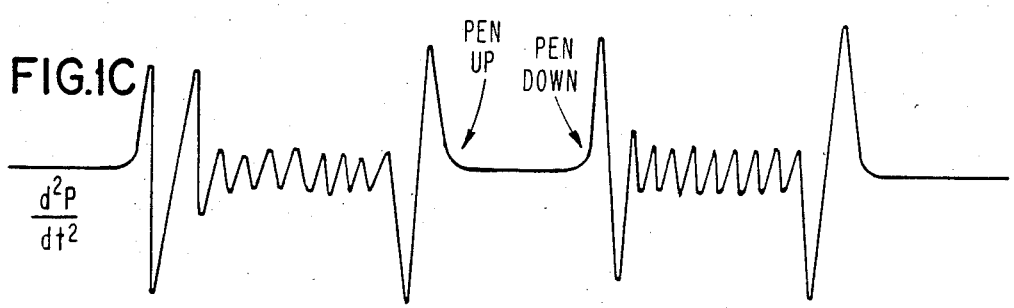
FIG.1C $\frac{d^2P}{dt^2}$

SEGMENTATION ALGORITHM FOR SIGNATURE VERTIFICATION

FIELD OF THE INVENTION

The present invention relates to the field of signature verification where it is desired to unequivocally identify an unknown person by means of comparing his signature with a previously known signature, and more particularly to an improved approach for pressure correlation and pen lift determination in a signature verification system which uses a low cost signature verification pen.

BACKGROUND OF THE INVENTION

There has always been a need in society for verifying a person's indentity for a variety of purposes. Modern day scientific technology has adopted the widespread use of computers and related mechanisms for the purposes of giving credit, performing electronic funds transfer, and so forth. In all facets of the financial community including the retail industry, securities industry, banking, and the like where sums of money, securities and/or materials are transferred between owners based on the reliance of one person on the purported identity of another. Electronic systems including various cryptographic instrumentalities together with secret identity numbers or keys provide a certain amount of security; however, the amount of security is predicated upon the degree of secrecy with which one is able to secure his own special identification key. Obviously, once a person's key is learned by another, presumably an unauthorized person, the other person may falsely assume his identity for a wide variety of electronic applications.

Identity verification by means of signatures has long been known in the art; however, most known systems have various shortcomings. Simply matching the appearance of two signatures is not satisfactory as expert forgers can usually duplicate the appearance of a person's signature as well as the person himself. The result of this is that when an expert forger is involved, even expert document examiners are frequently unable to discover that the signature is forged.

Recent developments in the field of automatic signature verification such as exemplified by U.S. Pat. No. 3,983,535 of Herbst et al and U.S. Pat. No. 4,128,829 of Herbst et al make the concept of personal identification via computer based signature analysis practical. The invention disclosed in U.S. Pat. No. 3,983,535 is based on the discovery that the accelerations of the stylus, which are proportional to the muscle forces exerted by the signer, are of predetermined consistent durations when forming particular strokes in a habitual signature. The nature of the process gives rise to various distortions in the time axis; e.g. pauses between sections of the name, skipped strokes, decorative rubrics, and the like. Thus, the signal is marked by regions of high correlation of unknown duration separated by variable regions of low correlation. Accordingly, the invention in U.S. Pat. No. 3,983,535 dealt with a method of regional correlation which registered these regions based initially on stylus contact and then shifting the regions individually to find the maximal of the correlation function weighted to penalize shifting. The results were then combined to make an overall verification decision.

The signature verification method disclosed in U.S. Pat. No. 3,983,535 was based on a single acceleration parameter of the signature dynamic, but as disclosed in U.S. Pat. No. 4,128,829, an even greater discrimination in the verification operation is possible using two orthogonally disposed (e.g. X and Y axes) acceleration components together with the pressure patterns which are produced during the writing of the signature and utilizing all three of these individual parameters in the correlation operation. The invention disclosed in U.S. Pat. No. 4,128,829 retained the concept of segmenting the sample and reference signatures, correlating individual segment pairs utilizing a series of successive shifts to obtain the maximum possible correlation, weighting the correlations, and finally combining the individual correlation statistics for all segments. An example of a pen that may be used in the Herbst et al verification system is disclosed in U.S. Pat. No. 4,142,175 of Herbst et al. This pen produces electrical signals proportional to accelerations in the X and Y axes and an electrical signal proportional to the stylus point pressure along the Z axis.

According to the Herbst et al procedure, reference acceleration and pressure signals are stored in memory in the electronic computer. Actually, as will be understood by those skilled in the art, digital representations of the acceleration and pressure signals produced by the pen when used to write a signature are also digitized so that all the arithemetical processing is performed digitally. In a typical system, when a customer opens an account, a signature acquisition feature on a computer terminal prompts the customer to sign his or her name several times. This produces signature data that is transmitted to the computer which selects the reference signal that is stored. Both the reference signals and the signals from the pen are segmented as a function of pen lifts which are detected by the pressure signal becoming zero. The segmented acceleration and pressure signals from the pen are then compared with the corresponding reference acceleration and pressure signal segments using a correlation algorithm. The details of the algorithm are disclosed in U.S. Pat. No. 3,983,535 which is incorporated herein by reference.

Previous signature verification systems measured the pressure as applied by the signer. The purpose of collecting that data was twofold. First, the pressure channel determined the starting and ending points of the signature and also determined the pen lifts. Pen lifts are critical to good correlation scores as they represent reproducible timing marks in the signature. Secondly, the d.c. component of the pressure was removed and the small a.c. variations of the pressure proved to correlate well and were necessary to produce good error rates. The problems of a d.c. pressure channel are numerous including baseline drift and hysteresis which required daily pen tuning. It also led to the lack of pen interchangeability. In application Ser. No. 394,043 filed June 30, 1982, now U.S. Pat. No. 4,513,437, by Chainer et al and assigned to the assignee of this application, there is described a pen that is more reliable and less expensive than that disclosed in U.S. Pat. No. 4,142,175 of Herbst et al. The pen described in the Chainer et al application measures two orthogonal axes of acceleration perpendicular to the pen axis and the first derivative of the pressure applied to the stylus tip. The advantages of this pen over previous designs are that it is less costly and easier to manufacture and more shock resistant and since the first time derivative of the pressure is measured, a.c. coupled amplifiers may be used thereby removing d.c. drift as a problem.

SUMMARY OF THE INVENTION

It is therefore an object of the present invention to provide a segmenting procedure in a signature verification system that is compatible with the newer a.c. coupled pens.

It is another object of the present invention to provide an algorithm to find the starting and ending points of the signatures and pen lifts based on the a.c. variations of the measured first time derivative of pressure.

The foregoing objects of the invention are achieved by measuring the first time derivative of pressure and computing the second time derivative. According to the invention, the times when the pen or other writing instrument is not in contact with the writing surface are identified by where the following conditions occur for an extended period of time: 1. The first derivative of the pressure is close to zero. 2. The second derivative is close to zero and any small changes in the second derivative are not consistently in the same direction. 3. The ends of the region when the pen is off the paper are bounded by large pressure changes, when the pen is removed from the paper and when it is pressed onto the paper. These large pressure changes appear as "spikes" in the first derivative signal and must occur with the proper sign and of sufficient amplitude to indicate a pen lift. Moreover, in the preferred embodiment, these tests are performed concurrently which provides for good program efficiency in terms of data storage and speed.

BRIEF DESCRIPTION OF THE DRAWINGS

The foregoing and other objects, aspects and advantages of the invention will be better understood from the following detailed description with reference to the accompanying drawings, in which:

FIGS. 1A, 1B and 1C are exemplary graphs of a pressure signal and the first and second time derivatives of the pressure signal, respectively, which illustrate the process according to the invention.

DETAILED DESCRIPTION OF THE PREFERRED EMBODIMENT OF THE INVENTION

Figure 2:
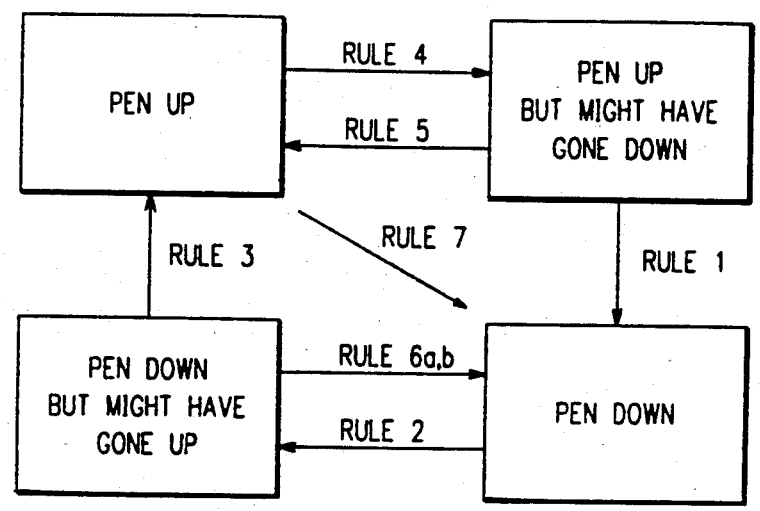
FIG. 2 is a state diagram showing the four states and allowed transitions used in the preferred embodiment of the invention.

Segmentation of the signature signals in the signature verification system described in the above referenced Herbst et al patents is determined by pen lifts. According to the present invention, a penlift is detected by the simultaneous occurrence of the first and second derivative being close to zero for an extended period of time and that there exist distinctive "spikes", characteristic of the pen being lifted from the paper at the beginning of the pen lift and being returned to the paper at the end of the pen lift. FIG. 1A shows a stylized example of a pressure signal. This graph has been drawn to clearly show the penlifts, but it will be understood that this is not the measured signal. The pen described in the above referenced application of Chainer et al does not measure pressure but rather the time derivative of pressure. FIG, 1B is the first time derivative of the pressure signal which is the measured signal, and FIG. 1C is the computed second time derivative of the pressure signal.

The preferred embodiment of the invention is implemented as a finite state machine. There are clearly only two physical states of the pen; it is either on the paper or off it. The finite state machine, however, allows for two other hypothetical states as illustrated in FIG. 2. These are referred to as "Pen up but might have gone down" and "Pen down but might have gone up". These hypothetical states are useful because a pen lift is an extended object and it is possible that a structure may look like a pen lift but later turn out not to meet the requirements. The extra hypothetical states simplify these decisions.

The procedure is implemented by PASCAL source program as listed hereinbelow. Comments are denoted by (* ... *). The interface provides the first derivative data as an ARRAY of integers, Zdata, and the number of points in this array, Zpts. The procedure returns the number of segments detected, Nsegs, and an array of integers which represents the location of the penlifts, Pen_index. The array Pen_index contains in sequential order, the index of the first pen down point, the index of the first pen up point, the index of the last pen up point. The constants defined at the start of the procedure have been chosen to work with the particular implementation of pen design and system implementation used currently.

```
PROCEDURE Penlift (Zdata : ARRAY (.1..99.) of INTEGER;
                   Zpts : INTEGER;
                   VAR Nsegs : INTEGER;
                   VAR Pen_index : (ARRAY(.1..50.) of
                                   INTEGER);
CONST
  zeros = 5;      (*The minimum length for a pen lift *)
  bandhi = 3;     (*The upper limit for the data in a pen
                  lift*)
  bandlo = -3;    (*The lower limit for the data in a pen
                  lift*)
  minslope = 10;  (*The minimum value of the second derivative
                  at ends*)
  diffw = 2;      (*The requirement for second derivative in a
                  pen lift*)
VAR
   i,j,quietcount,downcount,tempdown,tempup,upcount:
                                   INTEGER;
   aslope,fslope : INTEGER;
   quiet,up,upq,downq : BOOLEAN;
   secderiv : ARRAY(.1..999.) of INTEGER;
 1 BEGIN (*start of the procedure*)
   (*compute the second derivative*)
 2 secderiv(.1.) := 0;
 3 FOR i := 2 to Zpts DO
 4 secderiv(.1.) := zdata(.i.) - zdata(.i-1.);
   (*set the initial conditions*)
 5 j := 1; (*j is the index to the array of pen_index*)
   up := TRUE; (*assume the pen is up at the beginning*)
   downq := FALSE;
   downcount := segpts - 1;
   quietcount := 0;
10 tempdown := 2;
   FOR i := 4 to (Zpts-4) DO BEGIN (*move through the data*)
   (*compute the slope before and after this point*)
   (*aslope is the sum of the previous three slopes, fslope
   the sum of the next two slopes, this compensates for the
   different response of the pressure channel to pen down
   signals and pen up signals*)
   aslope := secderiv(.i-1.) + secderiv(.i-2.) +
   secderiv(.i-3.):
   fslope := secderiv(.i.) + secderiv(.i+1)
   (*determine if it is QUIET*)
   IF (zdata(.i.) >= bandlo) AND (zdata(.i.) <= bandhi) AND
15 ABS(Zdata(.i.)) > diffw)
   THEN Quiet := TRUE
   ELSE Quiet := FALSE;
   IF up THEN BEGIN (*pen is up section*)
     IF downq THEN BEGIN (*of might be down*)
20     IF quiet THEN BEGIN (*of quiet*)
   (*RULE 5*)    quietcount := quietcount +1;
                 IF quietcount >= zeros THEN downq :=
                 FALSE;
                 END (*of quiet*)
                 ELSE BEGIN (*of not quiet*)
25 (*RULE 1*)    quietcount := 1 (*reset quiet count*)
```

```
                    -continued
                        downcount := downcount +1;
                        IF downcount >= segpts THEN BEGIN
                            up := FALSE;
                            pen_index(.j.):=tempdown;
                            j := j + 1;
                            upq := FALSE;
                            END;
                    END; (*of not quiet*)
                    END (*of might be down*)
                ELSE BEGIN (* of pen up but not might be down*)
                    IF NOT quiet THEN
                        IF (fslope >= minslope THEN
                            BEGIN
(*RULE 4*)                  downq := TRUE;
                            tempdown := i−1;
                            downcount := 1;
                            quietcount := 0;
                            END
                        ELSE BEGIN
                            IF (quietcount < forsure) AND
                            (j>1)
(*RULE 7*)                     THEN BEGIN (*made a mistake*)
                                        (*the pen was
                                        not up*)
                                up := FALSE;
                                j := j−1;
                                upq := FALSE;
                                END; (*of mistake*)
                                END
                        ELSE (*quiet*)
                            quietcount := quietcount + 1);
                        END; (*of pen up but not might be down*)
                    END (*of pen up*)
ELSE (*pen down*)
    IF upq THEN BEGIN (*of down but might be up*)
        IF quiet THEN BEGIN (*of quiet*)
(*RULE 6a*)     upcount := upcount + 1;
                IF (upcount > 3) AND
                (((secderiv(.i.) > 0) AND
                secderiv(.i−1.) > 0))
                OR
                ((secderiv(.i.) < 0) AND
                secderiv(.i−1.) > 0)))
                THEN upq := FALSE; (*a mistake
                was
                made; this could not be a pen lift
                because the slope is greater than
                zero and of the same sign for two
                points in a row*)
(*RULE 3*)      IF upcount >= zeros THEN BEGIN
                    up := TRUE;
                    upq := FALSE;
                    quietcount := zeros;
                    downq := FALSE;
                    pen_index(.j.) := tempup;
                    j := j + 1;
                    END;The foregoing definition
                    of a
            END (*of quiet*)
            ELSE BEGIN (*of not quiet*)
(*RULE 6b*)     upcount := 0
                upq := FALSE;
                END; (*of not quiet*)
            END (*of down but might be up*)
        ELSE (*down and not might be up*)
            IF (quiet) AND (aslope >= slopelim) THEN
                BEGIN
(*RULE 2*)          upq := TRUE;
                    tempup := i−1;
                    upcount := 1;
                                END;
    END; (*of the do loop*)
    Nsegs := j DIV 2; (*calculate the number of segments*)
    END; (*of the procedure*)
```

In the procedure set forth above, lines 2 to 4 calculate the second derivative of the pressure. Lines 5 to 10 set the initial conditions, the pen is up; i.e. the signature has not started, and no segments have been detected.

The data is then scanned sequentially. The first four points and the last four are not scanned because it is necessary to examine the data on either side of the current point. Lines 12 and 13 compute the average second derivative on either side of the current point. The averaging process is different on the two sides because of the characteristics of the pen response to the pen going up and down. Lines 14 to 17 examine the data and the second derivative to see if it meets the requirements for a pen lift. This result is stored in the logical variable QUIET which is used later.

The procedure now enters the finite state machine. The state is defined by the logical variable UP, (true if the Pen is up, false if the pen is down), DOWNQ, (true if the pen is up but might have gone down, false otherwise), and UPQ, (true if the pen is down but might have gone up). This discussion will examine the program as would be the case at the beginning of a signature; i.e. the pen starts in the UP state. DOWNQ is false. Lines 37 to 41 (Rule 4) change the state to UP=FALSE, DOWNQ=TRUE when QUIET=FALSE and the second derivative average, fslope, is large enough to indicate that a segment might have started. The location of this occurrence is stored in TEMPDOWN, and DOWNCOUNT and QUIETCOUNT are initialized. On the next iteration of the DO LOOP, the state is different and the code following line 20 is executed. IF the data returns to the QUIET=TRUE condition for ZEROS number of points, DOWNQ is set back to FALSE, i.e. the pen is down, and TEMPDOWN is stored in PEN—INDEX and the NSEGS counter, j, is incremented. When the pen is down, UP=FALSE, the code following line 55 is executed. Since UPQ is FALSE, the program branches to line 77. The program stays in this state until QUIET=TRUE and the slope condition is met (Rule 2). This indicates that the pen might have been lifted and UPQ is set to TRUE, the index is saved in TEMPUP and UPCOUNT is initialized. This state forces the program to line 57. If it remains quiet for zeros number of points, then a pen up is declared and TEMPUP is placed into the next location of PEN—INDEX and the state is change to UP=TRUE and DOWNQ-=FALSE.

Those skilled in the art will recognize that the foregoing program listing is exemplary of the procedure according to the invention and that the inventive procedure can be implemented with other programs written in other programming languages. Anyone can make a copy of the above program listing for the purpose of studying this disclosure but no license, express or implied, is granted for commercial use of the program.

A particular feature of the program set forth in the above listing is that the four tests for determining a pen lift are performed concurrently. To reiterate, those four tests are that the first and second time derivatives of the stylus pressure are close to zero for an extended period of time and that the second derivative at either end of this interval be positive and large enough to indicate a real pen lift. It is possible to practice the invention by performing these tests in a sequential order and, in fact, an early implementation of the invention involved sequential testing with good results. However, the concurrent, finite state machine allows for mistaken conditions to be corrected easily and runs efficiently.

Having thus described our invention, what we claim as new, and desire to secure by Letters Patent is:

1. In a process for verifying a signature which comprises producing at least a first signal representative of the first time derivative of pressure transmitted by a writing instrument during the writing of at least one signature by a person whose identity is to be verified, the improved method of segmentating said first signal based on lifting said writing instrument from a writing surface comprising the steps of computing from said first signal the second time derivative of the pressure, examining said first and second time derivatives to detect quiet times indicative of lifting said writing instrument from a writing surface, determining if the detected quiet times have a duration which exceeds a predetermined time period, and testing the polarity of said second time derivative to determine if it is positive at the beginning and end of each detected quiet time.

2. The improved method according to claim 1 wherein the steps of examining, determining and testing are performed concurrently.

3. The improved method according to claim 1 further comprising the step of testing the amplitude of said second time derivative at the beginning and end of each detected quiet time to determine if the amplitude of said second time derivative exceeds a predetermined threshold.

4. The improved method according to claim 3 wherein the steps of examining, determining and testing the polarity and amplitude of said second time derivative are performed concurrently.

5. The improved method according to claim 1 wherein said process for verifying a signature comprises producing a plurality of signals, at least a second signal being representative of acceleration forces transmitted to said writing instrument during the writing of said signature, said method further comprising the step of segmenting said second signal according to the segmentation of said first signal.

6. In a signature verification method for determining if a person writing a signature has the same signature as a known signer, said method comprising producing and storing a plurality of first signal sets, wherein at least one set represents acceleration forces and another set represents the first time derivative of pressure forces, each transmitted by a known signer's hand to a writing instrument during the writing on a writing surface of at least one signature, producing and storing a plurality of second signal sets representative of said acceleration and first time derivative of pressure forces by a putative signer at a different time, segmenting said plurality of first and second signal sets for both the known and putative signatures to facilitate identifying regions of high probable correlation, correlating similar segment pairs in corresponding signal sets of said first and second sets, and combining the correlation results to produce a resultant correlation level value, the improvement wherein said step of segmenting comprises the steps of computing from the produced first time derivative of the pressure forces in said first and second signal sets the second time derivative of said pressure forces, examining said first and second time derivatives in said first and second signal sets to detect quiet times indicative of lifting said writing instrument from the writing surface, determining if the detected quiet times have a duration which exceeds a predetermined time period, and testing the polarities of said second time derivatives in said first and second signal sets to determine if said polarities are positive at the beginning and end of each detected quiet time.

7. The improved method according to claim 6 further comprising the step of testing the amplitude of said second time derivatives at the beginning and end of each detected quiet time to determine if the amplitude of said second time derivatives exceeds a predetermined threshold.

8. The improved method according to claim 7 wherein the steps of examining, determining, testing the polarity and testing the amplitude are performed concurrently.

* * * * *